United States Patent
Shahinpoor

(10) Patent No.: US 7,220,051 B2
(45) Date of Patent: May 22, 2007

(54) SHAPE MEMORY ALLOY TEMPERATURE SENSOR AND SWITCH

(76) Inventor: Mohsen Shahinpoor, 9910 Tanoan Dr. NE., Albuquerque, NM (US) 87111

( * ) Notice: Subject to any disclaimer, the term of this patent is extended or adjusted under 35 U.S.C. 154(b) by 0 days.

(21) Appl. No.: 11/023,874

(22) Filed: Dec. 27, 2004

(65) Prior Publication Data

US 2005/0105587 A1    May 19, 2005

Related U.S. Application Data

(63) Continuation-in-part of application No. 10/005,403, filed on Dec. 5, 2001, now Pat. No. 6,612,739, and a continuation-in-part of application No. 10/464,244, filed on Jun. 18, 2003, now Pat. No. 6,837,620.

(51) Int. Cl.
    *G01K 5/00* (2006.01)
(52) U.S. Cl. ............ 374/205; 374/200; 374/199; 374/195
(58) Field of Classification Search ......... 374/105, 374/200, 199, 198, 195, 194, 187, 205, 106; 116/221
    See application file for complete search history.

(56) References Cited

U.S. PATENT DOCUMENTS

| | | | | |
|---|---|---|---|---|
| 3,634,803 | A * | 1/1972 | Willson et al. | 337/123 |
| 4,490,975 | A * | 1/1985 | Yaeger et al. | 60/527 |
| 4,524,343 | A * | 6/1985 | Morgan et al. | 337/140 |
| 4,736,587 | A * | 4/1988 | Suzuki | 60/528 |
| 5,335,994 | A * | 8/1994 | Weynant nee Girones | 374/205 |
| 6,239,686 | B1 * | 5/2001 | Eder et al. | 337/382 |
| 6,972,659 | B2 * | 12/2005 | von Behrens et al. | 337/139 |

FOREIGN PATENT DOCUMENTS

| | | | |
|---|---|---|---|
| DE | 4100772 A1 * | 7/1991 | |
| EP | 13280 A1 * | 7/1980 | |
| JP | 63291333 A * | 11/1988 | |
| JP | 02021526 A * | 1/1990 | |
| JP | 03214533 A * | 9/1991 | |
| JP | 04167321 A * | 6/1992 | |
| JP | 04270928 A * | 9/1992 | |

* cited by examiner

*Primary Examiner*—Gail Verbitsky
*Assistant Examiner*—Mirellys Jagan
(74) *Attorney, Agent, or Firm*—V. Gerald Grafe

(57) ABSTRACT

A switch, such as an electromechanical or optical switch, whose state is responsive to temperature history, for example temperature excursions above or below a critical temperature. An element of the sensor made from shape memory alloy changes shape when exposed, even temporarily, to temperatures above the Austenitic start temperature As or below the Martensite start temperature Ms of the shape memory alloy sensor element. The shape change of the SMA element causes the sensor to change between two readily distinguishable states. The sensor can include a one-way stop element that creates a persistent indication of the temperature history. The switch also has built-in stops allowing the sensor to be manufactured and stored at temperatures above the Austenitic temperature without causing the indication of an over-temperature event, before the actual use.

13 Claims, 17 Drawing Sheets

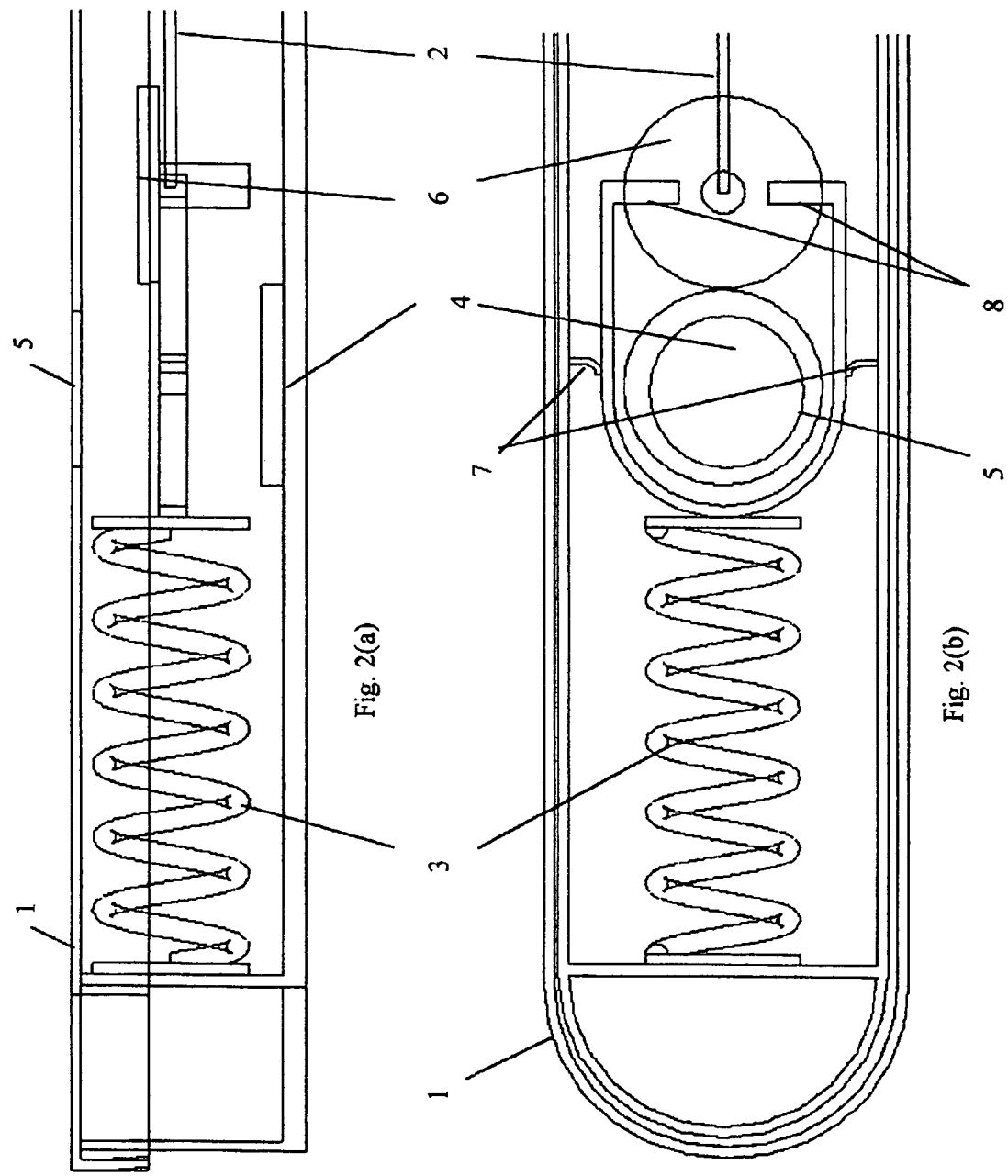

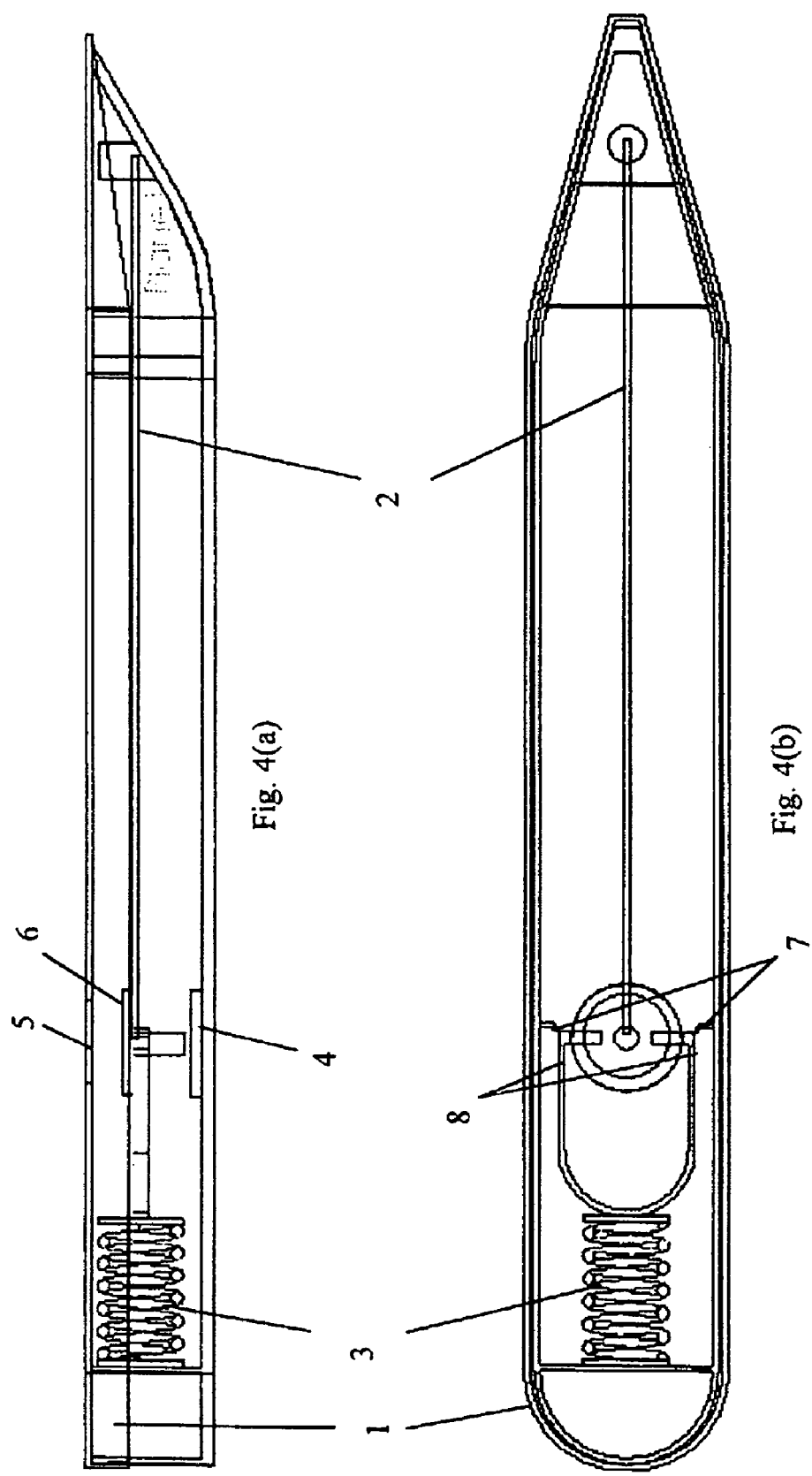

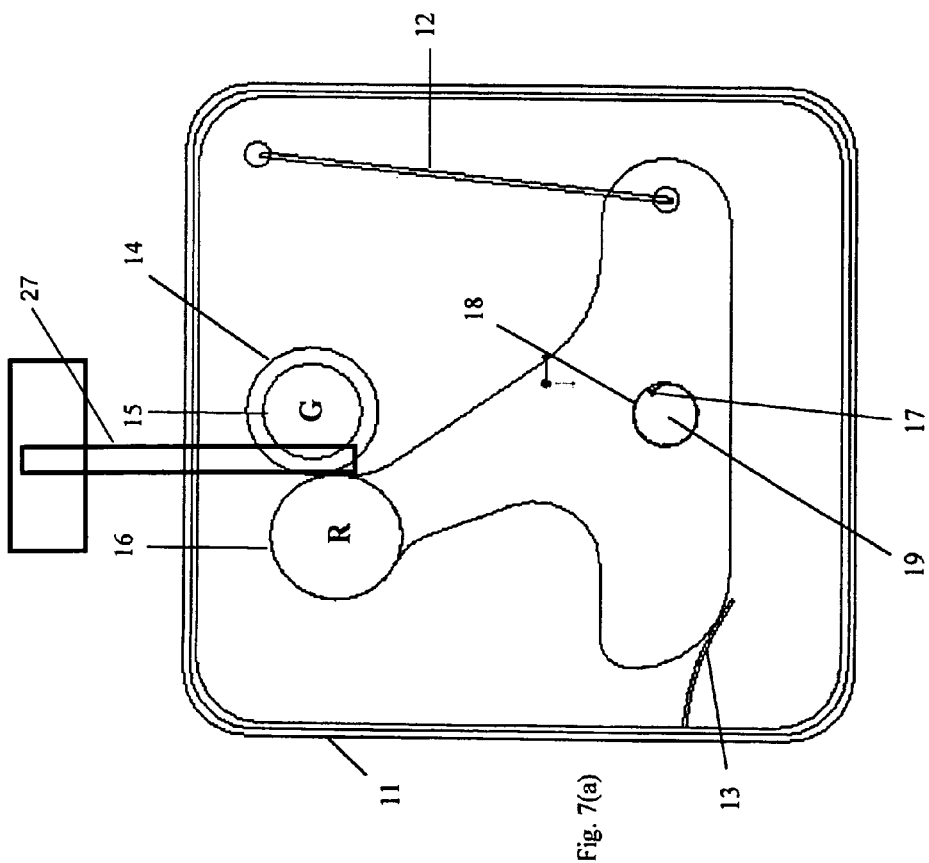

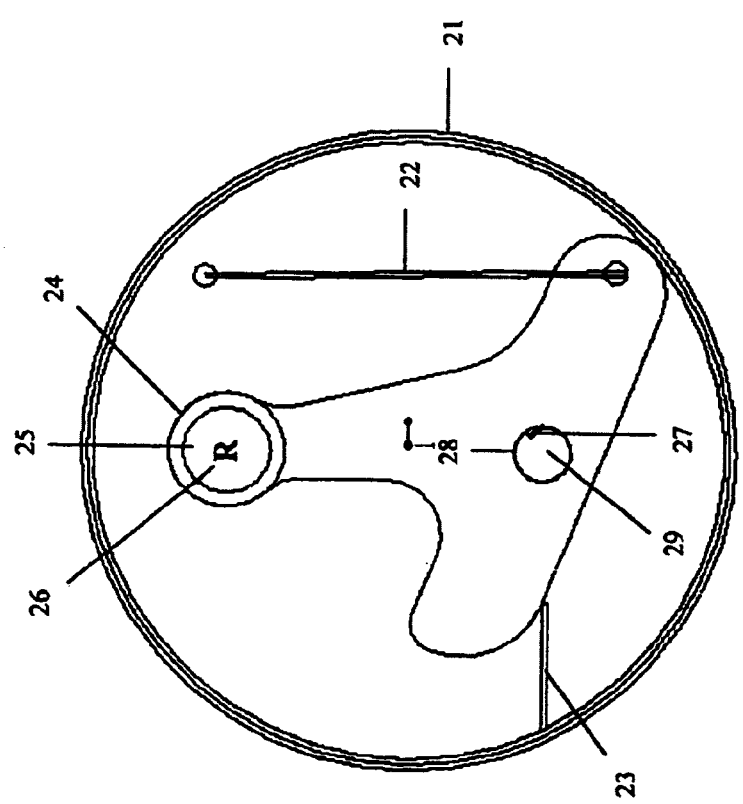

SHAPE MEMORY ALLOY TEMPERATURE SENSOR AND SWITCH

CROSS REFERENCE TO RELATED APPLICATIONS

This invention claims priority under 35 U.S.C. 120 as a continuation-in-part of U.S. patent application Ser. No. 10/005,403 filed on Dec. 5, 2001, now U.S. Pat. No. 6,612,739, titled "Shape Memory Alloy Temperature Sensor," incorporated herein by reference; and as a continuation-in-part of U.S. patent application Ser. No. 10/464,244, filed on Jun. 18, 2003 now U.S. Pat. No. 6,837,620, titled "Shape Memory Alloy Temperature Sensor," incorporated herein by reference.

BACKGROUND OF THE INVENTION

This invention relates to temperature sensors, specifically shape memory alloy temperature sensors that provide persistent indication once their temperature reaches, exceeds or goes below a critical value.

Exposure to temperatures above or below a critical temperature can damage many important materials. Food products such as frozen dairy products and frozen meats can spoil when exposed to thawing temperatures for even a short time. Products that need to be kept cool but unfrozen, such as pharmaceutical drugs, vaccines, and serums can spoil if frozen temporarily and then warmed up to normal but cool temperatures. Frozen medical products such as blood and certain pharmaceuticals can be unsafe once exposed to thawing or other high temperatures, even if the temperature later returns to a safe value. Low temperatures can also compromise important properties of some rubber and rubber-like materials. The damage is often unseen, and can persist even if the temperature returns to an acceptable level. This situation can arise in transportation, where a frozen product temporarily experiences high temperatures due to improper handling or cooling equipment malfunction or a cooled product temporarily experiences a freezing temperature due to improper handling or cooling equipment malfunction.

Many conventional temperature sensors do not provide a persistent record of temporary temperature deviations. Conventional temperature sensors, such as common thermometers, indicate the current temperature only. They provide a continuous indication of the current temperature of the material. They do not provide a permanent indication of out-of-range temperatures without additional permanent recording apparatus. Accordingly, there is a need for sensors that provide a persistent record of temporary out-of-range temperatures.

Shape memory alloys (SMAs) have properties that can be useful in developing the needed sensors. An SMA can be trained to have a certain shape in its Austenitic state or at temperatures above the SMA's Austenitic finish temperature $A_f$. The SMA moves in a certain fashion to a second shape, its Martensitic state, which is a softer state for the material, when the temperature drops below the Austenitic finish temperature $A_f$ and eventually reaches below the Martensite start temperature $M_s$. The SMA will not return to the Martensite shape without additional external force even if the temperature subsequently falls below the Austenitic temperature $A_f$. SMAs are used in a variety of applications, such as those described in "Design and Modeling of a Novel Fibrous SMA Actuator," Proc. SPIE Smart Materials and Structures Conference, vol. 2190, pp. 730–738 (1994), and "A Phenomenological Description of Thermodynamical Behavior of Shape Memory Alloys," Transactions of the ASME, J. Appl. Mech., vol. 112, pp. 158-163 (1990). SMAs have been suggested for use in persistent temperature indicators. See Shahinpoor, U.S. Pat. No. 5,735,607, incorporated herein by reference. The sensors suggested by the U.S. Pat. No. 5,735,607 patent, however, can require that the apparatus be kept below the threshold temperature during assembly and storage. This requirement can complicate manufacture and handling. There is a need for temperature indicators that can be manufactured, stored, and handled at arbitrary temperatures, then enabled to provide a persistent record of temporary temperature deviations. There is a further need for such indicators that can be integrated with other systems, where the temperature indicator can be used to control, activate, or deactivate other systems according to the state of the temperature indicator.

SUMMARY OF THE INVENTION

The present invention can provide a temperature-based control of systems based on the temperature history encountered by an indicator. The present invention contemplates a freeze indicator and an indicator of lower critical temperatures reached from higher temperatures; and an over-temperature indicator and an indicator of higher critical temperatures reached from lower temperatures. The present invention comprises a sensing element mounted with a body. The sensing element comprises a portion made with a shape memory alloy stressed by a resilient body such as a spring or an elastic flap. The sensing element mounts with the body, fixedly at a first end. At the second end, the sensing element mounts with a forcing element, which in turn mounts with the body. The forcing element exerts a force on the sensing element tending to elongate the shape memory alloy element once the freezing temperature or the lower critical temperature is reached. The force exerted is more than that required to elongate the shape memory alloy element when it is in its softened Martensitic state at the lower critical temperature, but less than that required to elongate the shape memory alloy element when it is in its contracted state. The sensing element, in one embodiment, mounts with the body in a unidirectional restraining relationship, where the restraining relationship allows the sensing element to elongate responsive to the forcing element, but, once a sufficient motion has occurred, substantially prevents shortening of the sensing element by means of one-way stops or locking mechanisms.

In operation, the apparatus can be assembled at temperatures above the critical temperature of the shape memory alloy element, causing the sensing element to be at a length less than that required to engage the restraining relationship. As long as the apparatus does not experience temperatures below the critical temperature, the shape memory alloy element will overcome the forcing element and the sensing element will not engage the restraining element. If the temperature drops below the critical temperature, then the shape memory alloy element will soften, allowing the forcing element to move the sensing element into the restraining relationship. Subsequent temperature elevation above the critical temperature will not return the sensing element to the original configuration, since the restraining element now prevents contraction of the shape memory alloy element by means of one-way stops. By making the positioning of the sensing element within the restraining relationship perceptible, the apparatus provides a persistent indication of even transitory temperature excursions into the region where the shape memory alloy element is in its softened state.

The present invention also comprises a variety of body, shape memory alloy element, sensing element, forcing element, and restraining element configurations. The state of the temperature indicator can be used to control a switch, as examples to activate or deactivate electrical or electronic systems. As an example, an electronic logging or communication system can be activated by the temperature indicator when an over- or under-temperature condition is reached, which activation or de-activation can persist due to the persistent temperature indication afforded by the present invention.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 2($a,b$) is an illustration of an apparatus according to the present invention.

FIG. 4($a,b$) is an illustration of an apparatus according to the present invention.

FIG. 7($a,b,c$) is an illustration of an apparatus according to the present invention.

FIG. 12($a,b,c$) is an illustration of an apparatus according to the present invention.

DETAILED DESCRIPTION OF THE INVENTION

The present invention comprises a sensing element mounted with a body. The sensing element comprises a portion made with a shape memory alloy. The sensing element mounts with the body, fixedly at a first end. At the second end, the sensing element mounts with a forcing element, which in turn mounts with the body. The sensing element exerts a force to resilient forcing element if the temperature is above the critical temperature. On the other hand the forcing element exerts a force on the sensing element tending to elongate the shape memory alloy element if the temperature is below or equal to the lower critical temperature (freezing temperature). The force exerted is more than that required to elongate the shape memory alloy element when it is in its softened Martensitic state, but less than that required to elongate the shape memory alloy element when it is in its contracted Austenitic state. The sensing element mounts with the body in either a unidirectional or rotatory restraining relationship, where the restraining relationship allows the sensing element to elongate responsive to the forcing element, but, once a sufficient motion has occurred, substantially prevents shortening of the sensing element by means of built in one-way no-return stops.

In operation, the apparatus can be assembled at temperatures above the critical temperature of the shape memory alloy element, causing the sensing element to be at a length less than that required to engage the restraining relationship. As long as the apparatus does not experience temperatures below the critical temperature, the shape memory alloy element will overcome the forcing element and the sensing element will not engage the restraining element. If the temperature drops below the critical temperature, then the shape memory alloy element will soften, allowing the forcing element to move the sensing element into the restraining relationship. Subsequent temperature elevation above the critical temperature will not return the sensing element to the original configuration, since the restraining element now prevents contraction of the shape memory alloy element. By making the positioning of the sensing element within the restraining relationship perceptible, the apparatus provides a persistent indication of even transitory temperature excursions into the region where the shape memory alloy element is in its softened state.

The present invention also comprises a variety of body, shape memory alloy element, sensing element, forcing element, and restraining element configurations.

EXAMPLE EMBODIMENT

FIGS. 1-6 are schematic illustrations of various states of an example embodiment of the present invention. The apparatus generally comprises a body 1, a sensing element 2 mounted with the body 1, and a forcing or resilient element 3 mounted with the body 1 and the sensing element 2. Additional elements, and their interaction to achieve the desired functionality, are described below.

Figure 1A:
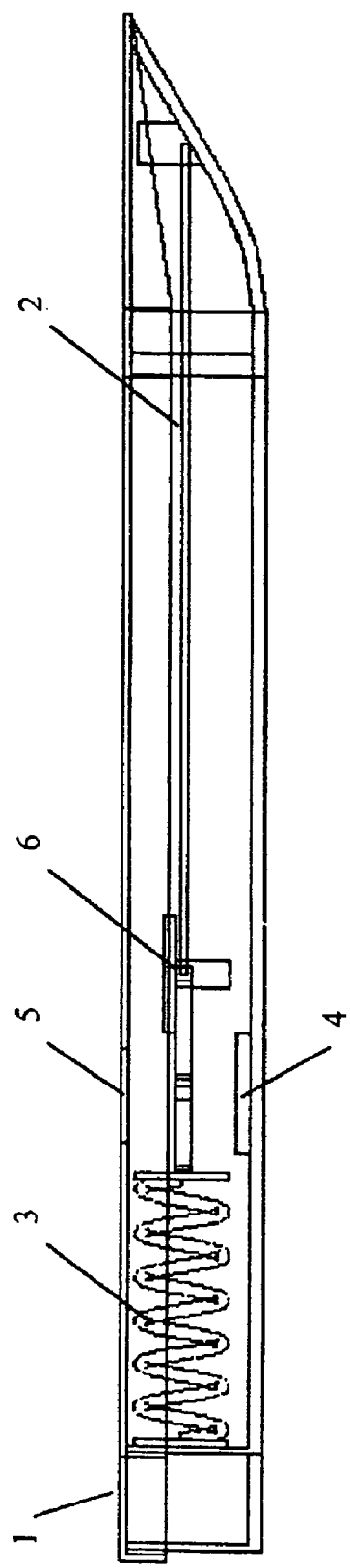
FIG. 1($a,b$) is an illustration of an apparatus according to the present invention.
Figure 1B:
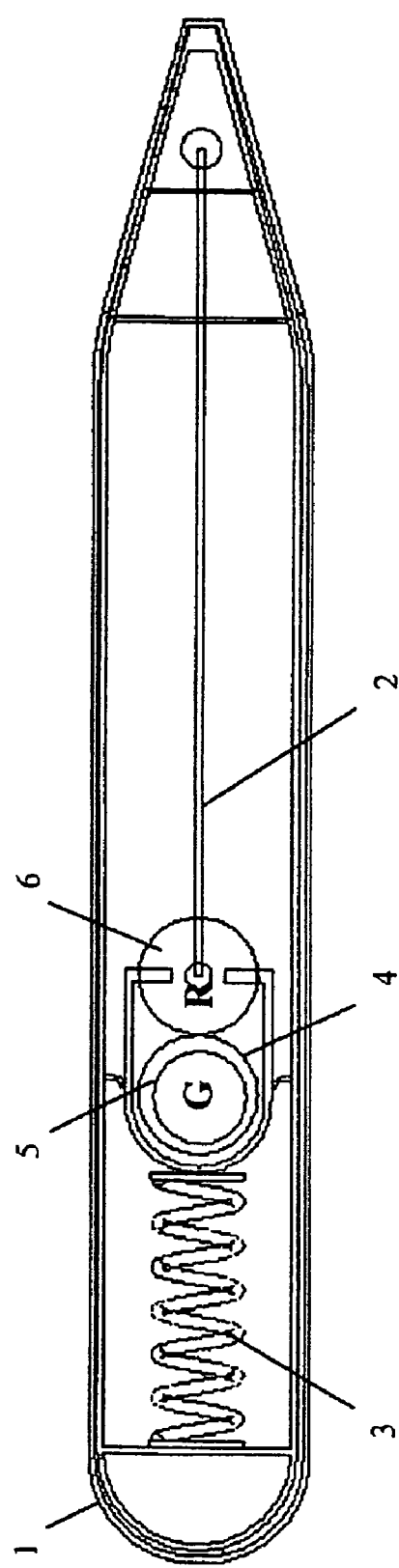

FIGS. 1(*a*) and 1(*b*) are the side view and the top view of a needle version of an apparatus according to the present invention suitable for persistent indication of low temperature events. Sensing element 2 is made at least in part with and SMA. In FIG. 1(*a*) the SMA wire 2 is its Austenitic contracted state and pulls the resilient element 3 (e.g., a spring) open and tensioned. A first indicator 4, for example a green circle, will be visible through a window 5 in the body 1, since an obscuring indicator 6 is pulled out of an obscuring relationship by the contracted SMA element 2.

FIGS. 2(*a*) and 2(*b*) are a close up side view and a top view of the example embodiment shown in FIG. 1(*a,b*). The SMA element 2 is its Austenitic contracted state and pulls the resilient body 3 open and tensioned. A first indicator such as a green surface 4 will be visible through a window 5 in the body 1. Locking mechanism 7, mounted with the body 1, is configured such that it allows motion of the obscuring indicator 7 and an associated carrier 8.

Figures 3A, 3B:
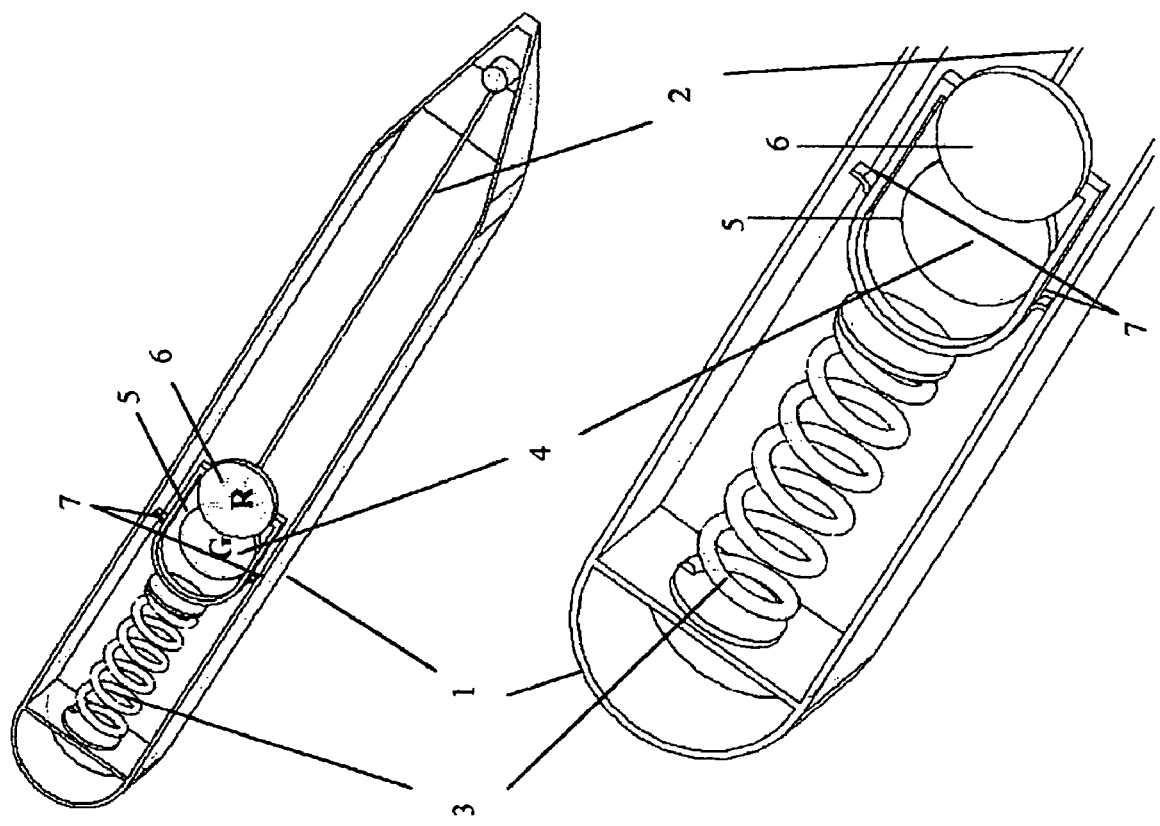
FIG. 3($a,b$) is an illustration of an apparatus according to the present invention.

FIGS. 3(a) and 3(b) are an isometric view and a close up isometric view of the example embodiment shown in FIG. 1(a,b), with the apparatus at a temperature just below the Austenite finish temperature of the SMA wire 2. The SMA wire 2 begins to soften as it approaches its soft Martensitic state at lower temperature from its Austenitic contracted state. The resilient body 3 stretches the SMA wire 2 and pulls the obscuring indicator 6, e.g., a red circle, to a position where the obscuring indicator 6 partially covers the first indicator 4. The window 5 in the body will show part of each indicator 4,6.

Figures 5A, 5B:
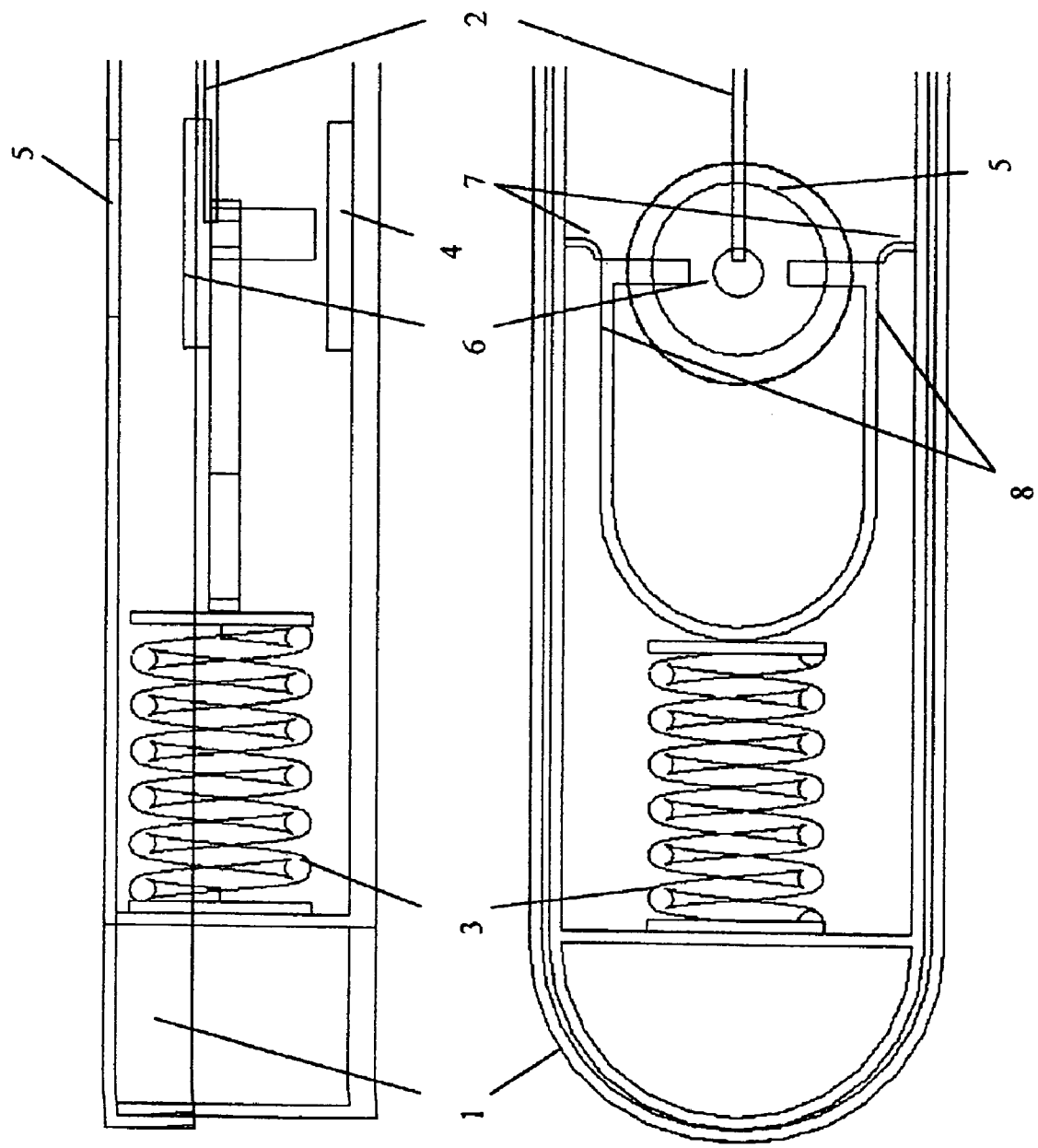
FIG. 5($a,b$) is an illustration of an apparatus according to the present invention.
Figures 6A, 6B:
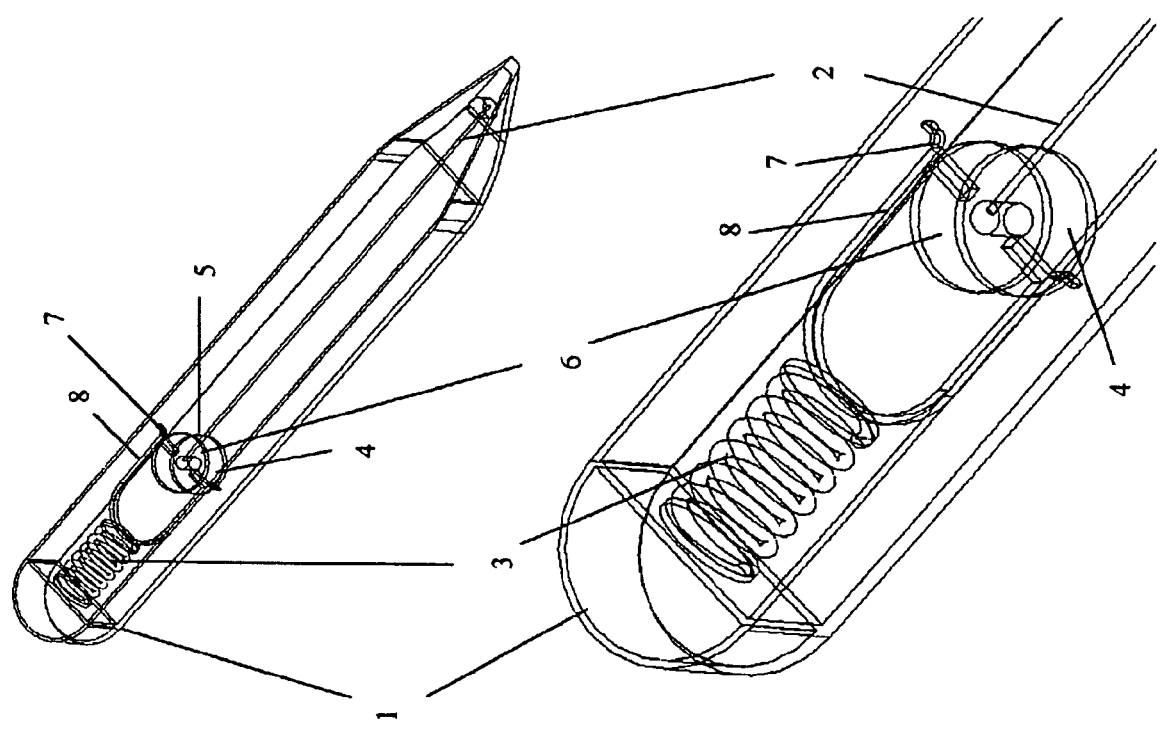
FIG. 6($a,b$) is an illustration of an apparatus according to the present invention.

FIGS. 4(a) and 4(b) are a side view and a top view of the example embodiment shown in FIG. 1(a,b), with the apparatus at a temperature below the critical lower or freezing temperature at which the SMA wire is in its soft Martensite state. FIGS. 5(a) and 5(b) are a close up side view and a top view of the apparatus in the same temperature condition. FIGS. 6(a) and 6(b) are an isometric view and a close up isometric view of the apparatus in the same temperature condition. The SMA wire 2 softens as it reaches its soft Martensitic state at lower temperature from its Austenitic contracted state and the resilient body 3 stretches the SMA wire 2 and pulls the obscuring indicator 6 to completely cover the first indicator 4. The locking mechanism, comprising flaps 7, engage carrier 8 of the obscuring indicator 6, preventing it from moving to reveal the first indicator 4 even if the temperature goes back up to normal from the lower critical or freezing temperature. The indicator will consequently show, for example, a persistent red circle through the indicator window 5 if the apparatus ever experiences a temperature below the critical temperature, even if the temperature subsequently rises above the critical temperature. Various implementations of the restraining relationship are suitable for use with the present invention. For example, a pin can engage a slot or depression at the appropriate position. As another example, sawtooth or ratchet structures can allow motion in only a single direction. Other variations will be apparent to those skilled in the art.

EXAMPLE EMBODIMENT

Figure 8:
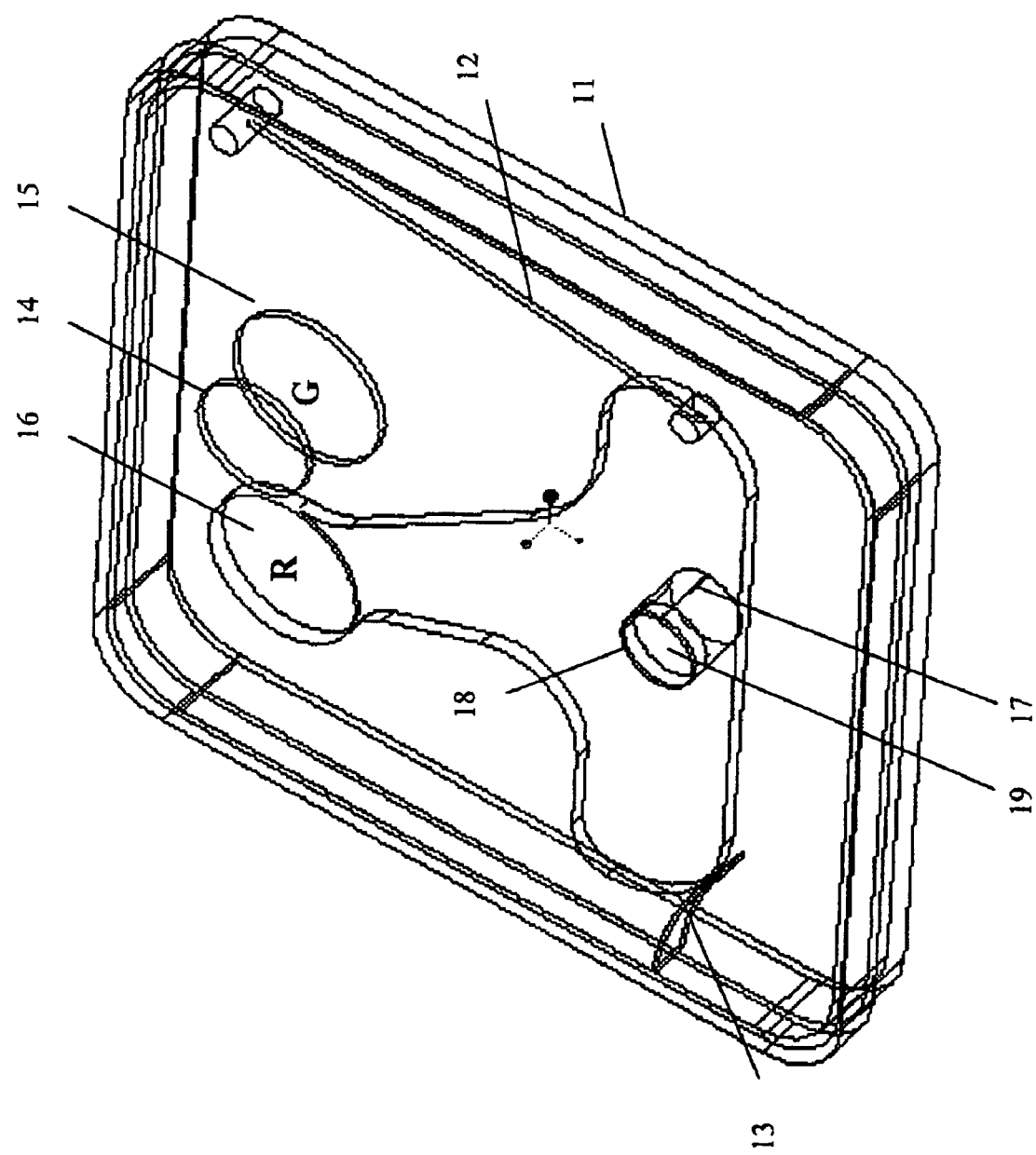
FIG. 8 is an illustration of an apparatus according to the present invention.

FIGS. 7-9 are schematic illustrations of an example embodiment of the present invention. The apparatus generally comprises a body 11, a sensing element 12 mounted with the body 11, and a forcing or resilient element 13 mounted with the body 11 and the sensing element 12. Additional elements, and their interaction to achieve the desired functionality, are described below.

FIGS. 7(a), 7(b) and 7(c) comprise a front view, top view, and side view of the flat square embodiment of an apparatus according to the present invention. Sensing element 12 comprises at least a portion made with an SMA wire. In the figure, the SMA wire 12 is its Austenitic contracted state and pulls the resilient body 13 open and tensioned. The apparatus accordingly will show a first indicator 14, for example a green circle 14, through an indicator window 15. The SMA wire prevents a second indicator 16, for example a red circle, from moving to where it would obscure the first indicator 15. The second indicator 16 mounts with an element that is pivotably mounted with the body 11. The pivotable mounting can comprise a pivoting plug 19, with a stepped keyway 18 that engages a no-return stop 17 to prevent the second indicator from returning to the position shown in the figure once it has moved to a position obscuring the first indicator 15 and also engaging the no-return stops 17.

FIG. 8 depicts an isometric version of the example embodiment shown in FIG. 7. The SMA wire 12 is its Austenitic contracted state and pulls the resilient body 13 open and tensioned. The figure shows a pivoting plug, no-return stops, and stepped keyway. The desired functionality can also be achieved with other restraining relationship mountings. For example, the second indicator 16 or corresponding element can be configured to engage the first indicator 14 or the window 15 by, as an example, fitting into a recess or over a protrusion thereon. Keys, plugs, latches, and bendable legs (as in the previous example embodiment) can also be used in various combinations to accomplish the desired restraining relationship when the second indicator moves to the appropriate position.

Figure 9A:
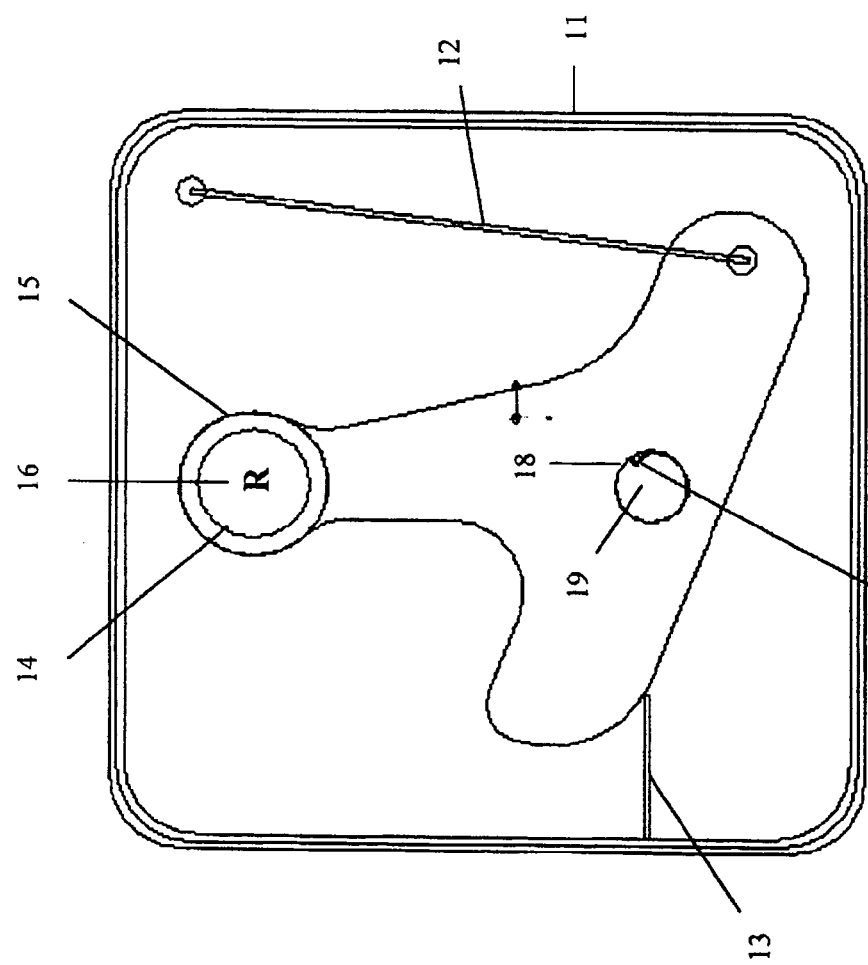
FIG. 9($a,b,c$) is an illustration of an apparatus according to the present invention.
Figure 9C:
Figure 9B:
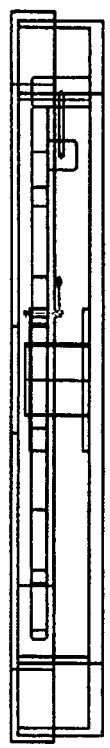

FIGS. 9(a), 9(b) and 9(c) are the front view, top view and the side view of the example embodiment of FIGS. 7-8, shown at a temperature below the critical lower or freezing temperature at which the SMA wire 12 is in its soft Martensite state. The SMA wire 12 softens as it reaches its soft Martensitic state at lower temperature from its Austenitic contracted state and the flap spring or the resilient body 13 stretches the SMA wire and rotates the second indicator 16 (e.g., red circle) to completely cover the first indicator 14 (e.g., green circle). The one-way no-return stops—flaps 17 on the pivoting plug 19 engages the edges 18 of the second indicator's associated element to prevent it from moving responsive to subsequent contraction of the SMA wire if the temperature goes back up to normal from the lower critical or freezing temperature. The apparatus can show a persistent red circle through its indicator window 15 indicating that the apparatus has experienced the lower critical temperature.

EXAMPLE EMBODIMENT

Figure 10C:
FIG. 10($a,b,c$) is an illustration of an apparatus according to the present invention.
Figure 10A:
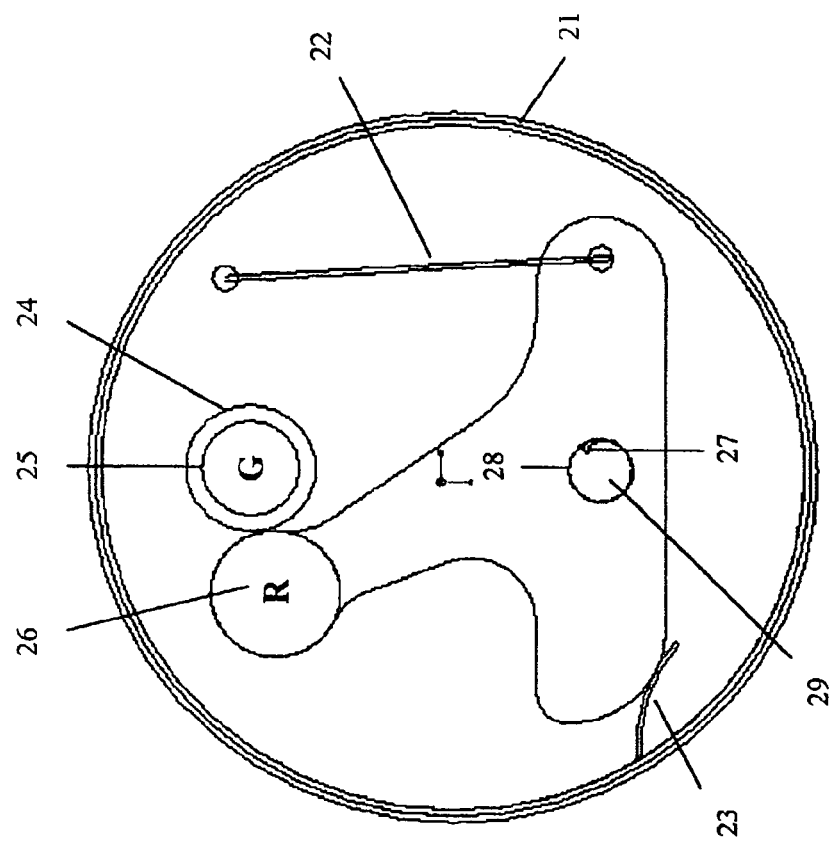
Figure 10B:
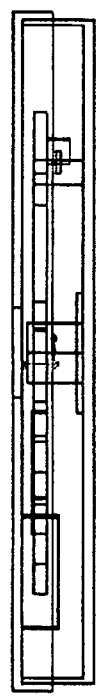
Figure 11:
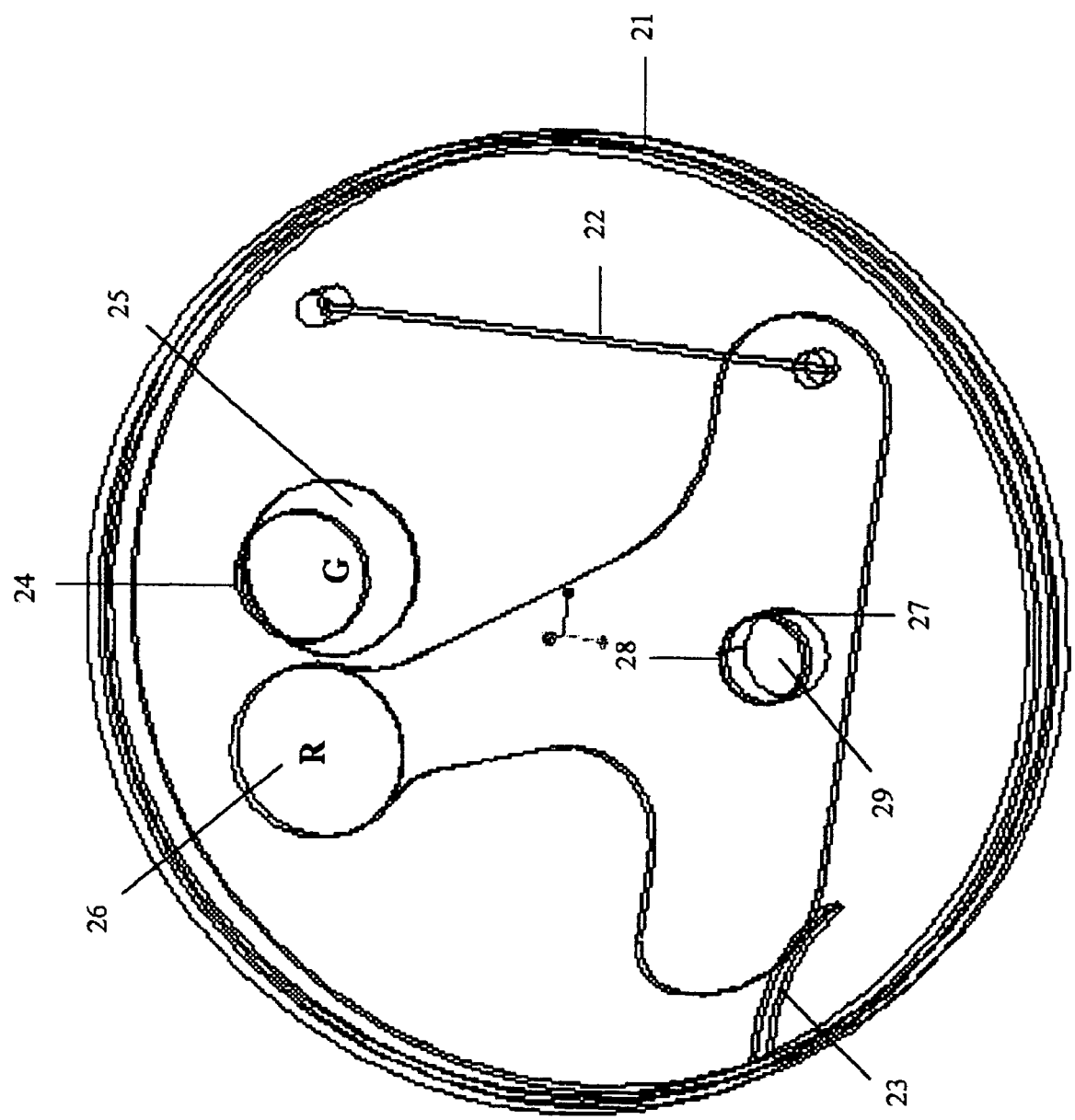
FIG. 11 is an illustration of an apparatus according to the present invention.

FIGS. 10-12 are schematic illustrations of various states on an example embodiment of the present invention. The apparatus generally comprises a body 21, a sensing element 22 mounted with the body 21, and a forcing or resilient element 23 mounted with the body 21 and the sensing element 22. Additional elements, and their interaction to achieve the desired functionality, are described below.

FIGS. 10(a), 10(b) and, 10(c) comprise a front view, top view, and side view of an example embodiment of the present invention at temperatures above the critical (freeze or lower) temperature. FIG. 11 depicts an isometric view of the same example embodiment. Sensing element 22 comprises an SMA wire 22. The SMA wire 22 is its Austenitic contracted state and rotates the resilient body or the spring 23 open and tensioned. Thus the apparatus will show a first indicator 24 (e.g., a green circle) through an indicator window 25 while a second indicator 26 (e.g., a red circle) is prevented by the contracted SMA wire 22 from obscuring the first indicator 24. The second indicator 26 mounts with the body 21 with a pivtable mounting comprising one-way no-return stops 27 on the pivoting plug 29 with a step keyway 28, similar to that discussed in the previous embodiment.

FIGS. 12(a), 12(b) and 12(c) are the front view, top view and the side view of the circular flat version of the freeze (or lower critical temperature) indicator 21 at temperatures below the critical lower or freezing temperature at which the SMA wire 22 is its soft Martensite state. Thus the SMA wire 22 softens as it reaches its soft Martensitic state at lower temperature from its Austenitic contracted state and the flap spring or the resilient body 23 stretches the SMA wire and rotate the red circle assembly 26 to completely cover the green circle assembly 24. The one-way no-return stops (flaps 27 on the pivoting plug 29 engages the edges 28 of the indicator to prevent it from contraction of the SMA wire if the temperature goes back up to normal from the lower critical or freezing temperature. Thus the indicator will show a persistent red circle through its indicator window 25 indicating that the package has experienced the lower critical temperature.

EXAMPLE EMBODIMENT

Figure 13A:
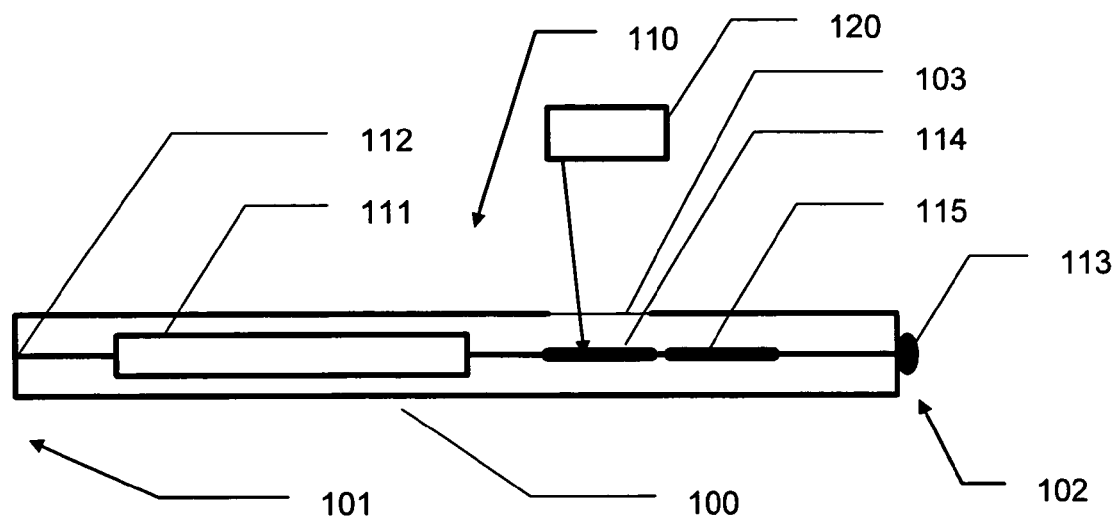
FIG. 13($a,b,c$) is an illustration of an apparatus according to the present invention.
Figure 13B:
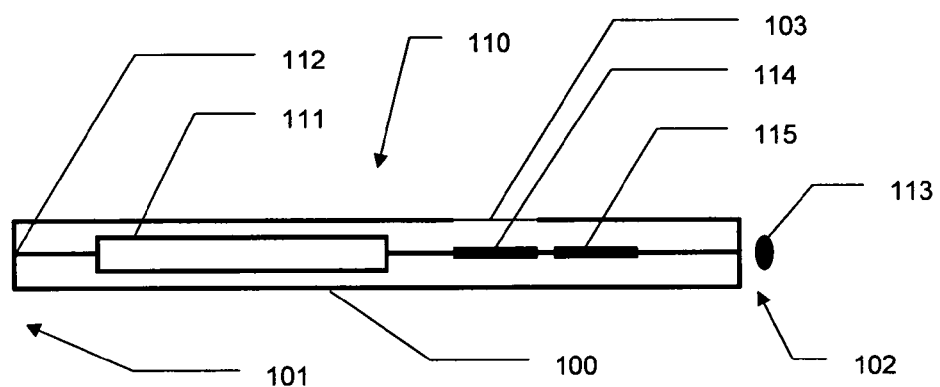
Figure 13C:
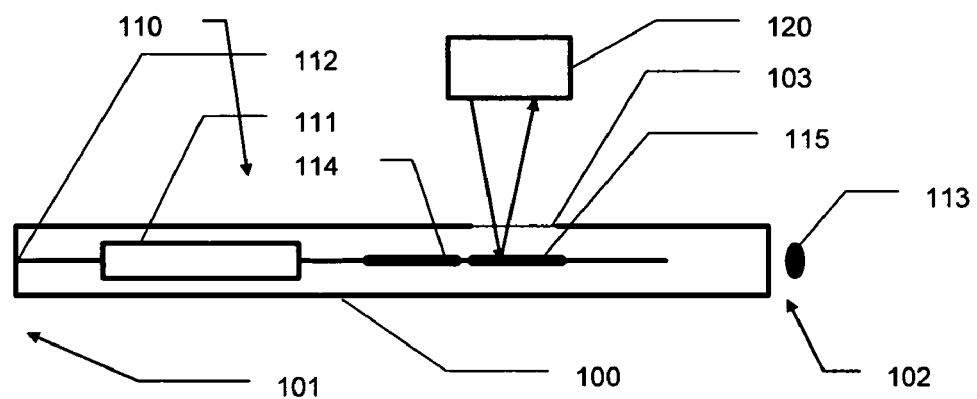

FIG. 13(a,b,c) is a sectional view of an embodiment of the present invention. A sensing element 110 mounts with a body 100. A first end 112 of the sensing element 110 mounts fixedly with an attachment portion 101 of the body 100. The sensing element comprises a SMA portion 111. The sensing element further comprises a removable engagement portion 113 that engages a holding portion 102 of the body 100. The engagement portion 113 prevents changes in length of the sensing element 100 relative to the body 100. Conversion of the fixed relationship between the engagement portion 113 and the holding portion 102, for example by cutting the engagement portion 113 from the sensing element 110, allows the sensing element 110 to contract. Exposure to temperature above the critical temperature of the SMA portion 111 can cause the SMA portion 111 to contract (once the restraint of the engagement portion is removed), moving, for example, an indicating portion 114 relative to an indicator surface 103. That movement can be perceived, for example by using different colors for the indicating portion 114 and the indicator surface 103, allowing ready determination of whether the apparatus has been exposed to excessive temperatures.

Once the SMA portion contracts, it does not return to its original length without the application of force. Consequently, the indication of an over-temperature condition persists, even if the temperature subsequently returns to below the critical temperature. The engagement portion allows the apparatus to be manufactured, stored, and handled at temperatures in excess of the critical temperature, since the engagement portion prevents contraction of the SMA portion. The apparatus can be installed in the temperature-critical environment, and the temperature reduced to below the critical temperature, before changing the fixed engagement. Subsequent temperature changes will provide the desired persistent indication of exposure to elevated temperature.

The SMA portion can be a wire made with a SMA, of length equal to the distance between the two mounting portions in one state, and less than the distance in the other state. The wire can be passed through an opening such as a notch or hole in the body, and a bend or a thickened portion used to prevent the wire from moving back through the opening. After the apparatus is in place, and the temperature reduced below the critical temperature, then the bend or thickened portion can be removed. Subsequent temperature increases can initiate a shortening of the SMA wire; the difference in length relative to the body can provide an indication of an over-temperature condition. Even if the temperature excursion was only transitory, the SMA wire will not return to its original length once shortened, absent application of external force. Discernment of the condition of the apparatus can be facilitated by highlighting the relationship between the sensing element and the body. As examples, colored regions and witness marks can be used to make changes in the length or shape of the SMA portion readily apparent.

EXAMPLE EMBODIMENT

Figure 14:
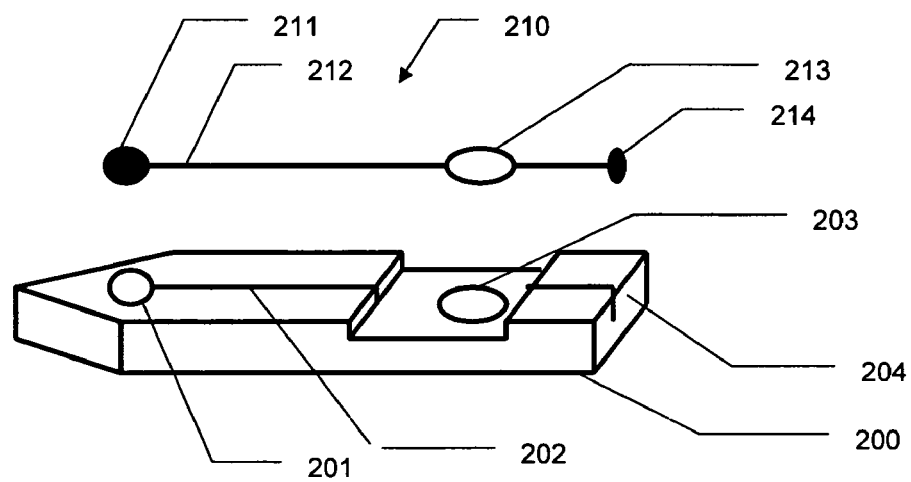
FIG. 14 is an illustration of an apparatus according to the present invention.

FIG. 14 is a schematic view of an embodiment of the present invention. A body 200 defines a channel having an end 201, a groove 202, an indicator region 203, and terminating with the end of the body 204. A sensing element 210 comprises a first end 211 shaped to fit in the end 201 of the channel, a length of SMA wire 212 sized to fit in the groove 202, an indicator 213 (e.g., green), and an indicator 213' (e.g., red), and a second end 214, or engagement knob, sized to be too large to fit into the groove at the end of the body 204. The length of wire 212 is, in its expanded or Austenitic state, approximately as long as the groove 202, and, in its contracted or Martensitic state, shorter than the groove 202.

The sensing element can be installed into the body at a temperature above the Austenitic finish temperature $A_f$, even though the length in the Martensitic state is less than the length of the groove. In the Martensitic state, the sensing element (SMA wire) is in a superelastic state. An end of the element can be pressed the end of the channel. The SMA wire can be stretched and the engagement knob placed beyond the end of the groove. Once the apparatus is in the desired temperature environment (e.g., frozen below the Austenitic finish temperature $A_f$), the sensing element can be altered, for example by cutting off the second end or the engagement knob. If the critical temperature is reached, then the SMA wire will contract and move the red indicator in front of the display window. The indicator's changed position can be highlighted with, for example, contrasting colors and windows in the body. Indicators having area of greater than 50 mm² can be suitable for some applications. The body in the figure is shown with one end of narrow cross-section to facilitate insertion in items whose temperature is to be monitored, for example into foodstuffs such as meat. The indicator in the figure is shown as a flat element; it could comprise a colored portion of the wire; or witness marks on the wire, the body, or both; or a differently shaped portion of the wire such as a flattened portion thereof.

EXAMPLE EMBODIMENT

Figure 15A:
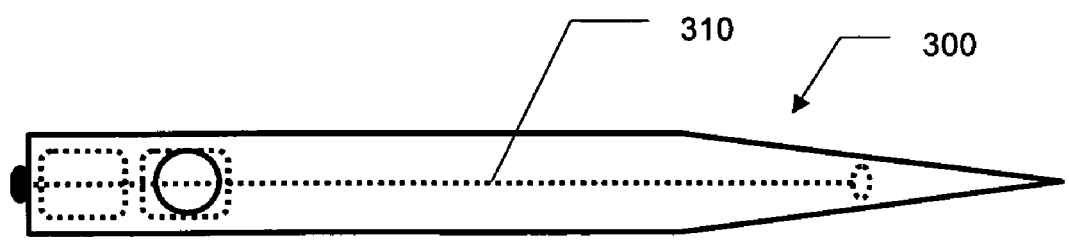
FIG. 15($a,b$) is an illustration of an apparatus according to the present invention.
Figure 15B:
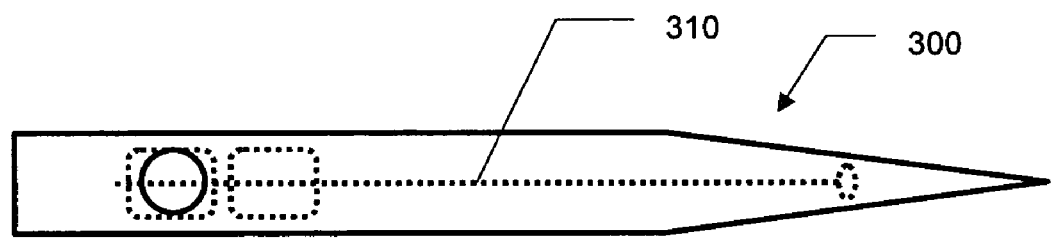

FIG. 15(a,b) is an illustration of an embodiment of the present invention. A wire or ribbon is made of a shape memory alloy 310. The wire or ribbon 310 mounts with a body 300, extending from a first portion of the body to a second portion of the body. A first end of the wire or ribbon mounts with the first portion of the body such that movement of the wire or ribbon toward the second portion of the body is constrained, for example by pinning the wire or ribbon to the body. A second end of the wire or ribbon has a thickened section attached. The wire or ribbon passes through a portion of the body that allows passage of the wire or ribbon, but does not allow passage of the thickened section. Two indicators mount with the wire or ribbon. The body has a first end shaped as a point to allow easy insertion into meat or other items whose temperature is to be monitored. The body further comprises a window or other indication feature that allows discernment of movement of the indicators mounted with the wire or ribbon. For example, the body can comprise a window that is over the first indicator when the wire or ribbon is in its longest state. Contraction of the wire or ribbon can bring the second indicator into view in the window. Giving the indicators contrasting colors can allow for easy human discrimination between indicators. Changes in temperature will not cause a change in indicator as long as the thickened portion is attached since movement of the wire or ribbon, and hence movement of the indicators, is constrained. Removal of the thickened portion allows the wire or ribbon to contract when the temperature exceeds a critical value, moving the indicators so that a different indicator is now discernible. The movement constraint provided by the thickened portion can also be provided, for example, by a bend in the wire or ribbon, or an additional element added to the wire or ribbon such as a pin attached to the wire or ribbon.

Embodiments of the present invention can sense a wide range of temperatures when made with appropriate SMAs. Those skilled in the art know of many suitable SMAs, including Ag—Cd, Au—Cd, Cu—Al—Ni, Cu—Sn, In—Ti, Ni—Al, Ni—Ti, Fe—Mn—Si, Cu—Zn—A, Cu—Al—Ni, alloys thereof, and shape memory polymers such as polyurethanes. These materials typically possess Austenitic temperatures from −200° C. to 110° C. The addition of excess nickel, iron, chromium, and copper to the equiatomic alloy is common to adjust its physical properties (including its Austenitic finish temperature $A_f$).

EXAMPLE MANUFACTURING PROCESS

An example manufacturing procedure for some embodiments of a thaw/refrozen food sensor according to the present invention is briefly described here. This manufacturing method can be modified to accommodate other threshold temperature values and applications. The manufacturing procedure described provides for manufacture of the sensor at room temperature. The sensor can be inserted or mounted on a fresh food package before the package is frozen. The package can then be frozen, and the sensor used to indicate if the food package has ever been thawed, even if subsequently refrozen.

Figure 16A:
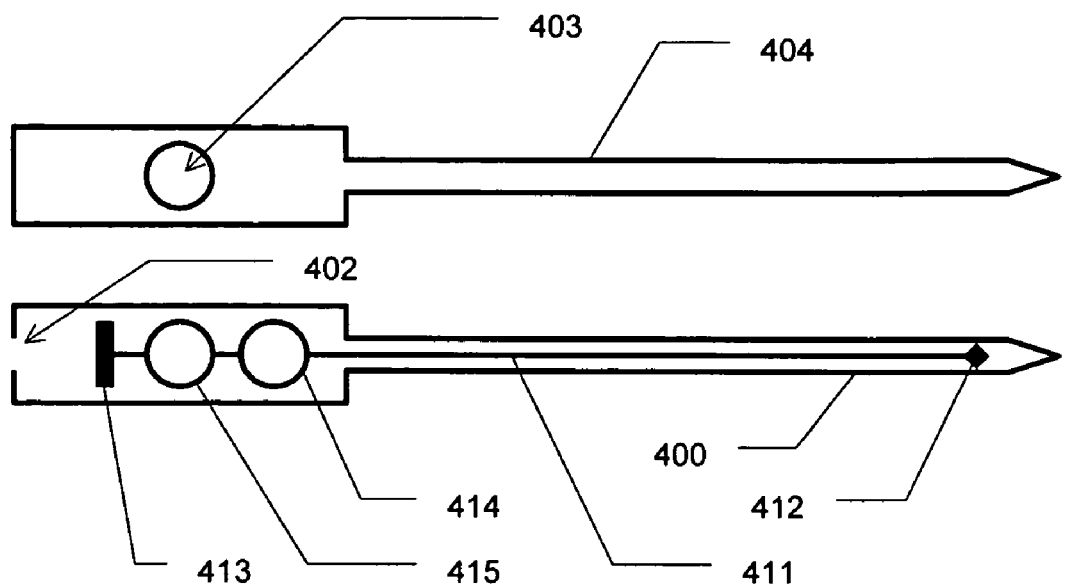
FIG. 16($a,b,c,d$) is an illustration of an apparatus according to the present invention.
Figure 16B:
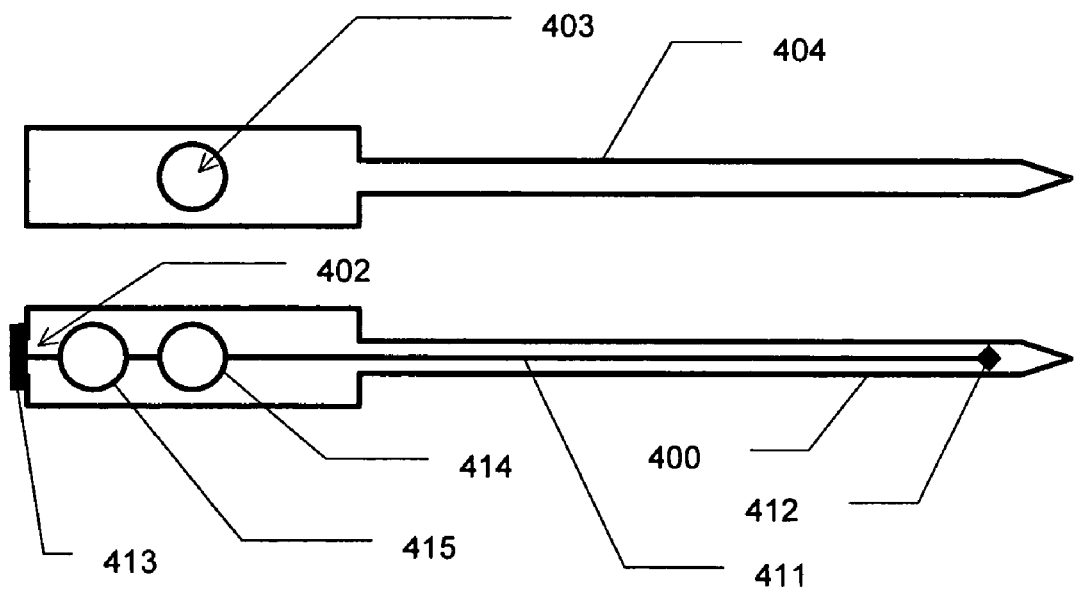

As shown in FIG. 16a, manufacture can start in room temperature by placing an SMA wire assembly 411 in the sensor shell 400 with one end secured to a pin 412. In this situation the SMA portion 411 is at room temperature which can be well above a threshold Austenitic finish temperature $A_f$ of, for example, 1° C. (Celsius). Such an Austenitic temperature is slightly above a freezing temperature of 0° C. The SMA at room temperature is in a contracted state and is shorter than the total length of the shell 400. Shell lengths between 5 cm and 15 cm can be suitable. The SMA wire (diameters of 250-500 microns can be used) is in a superelastic state (Martensitic state) contracted and behaving like a rubber band. Thus, the red indicator 415 will be lined up with an indicator window 403. At this stage of manufacturing the engagement knob 413 is grabbed and the wire 411 is stretched (superelastic) to reach the holding slot or portion 402 and the knob is placed securely in the notch or slot of holding portion or groove 402 as shown in FIG. 16b. The green indicator 414 now will be lined up with the indicator window 403 and the SMA wire will be in a stretched state. The cap 404 containing the indicator window 403 is now placed or firmly snapped on top of the sensor shell 400 and the sensor is ready to be used in a fresh unfrozen body of food package.

Figure 16C:
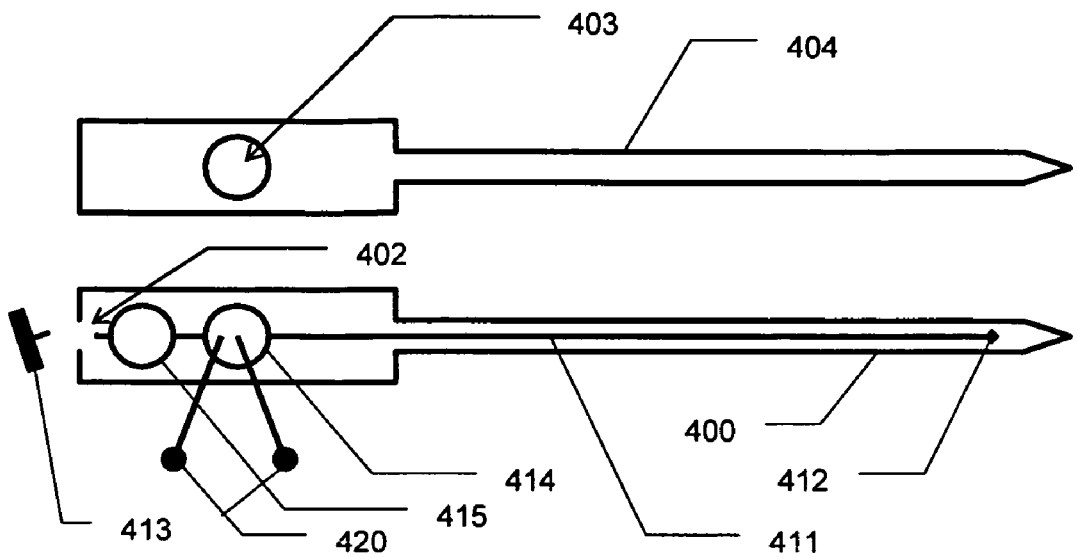
Figure 16D:
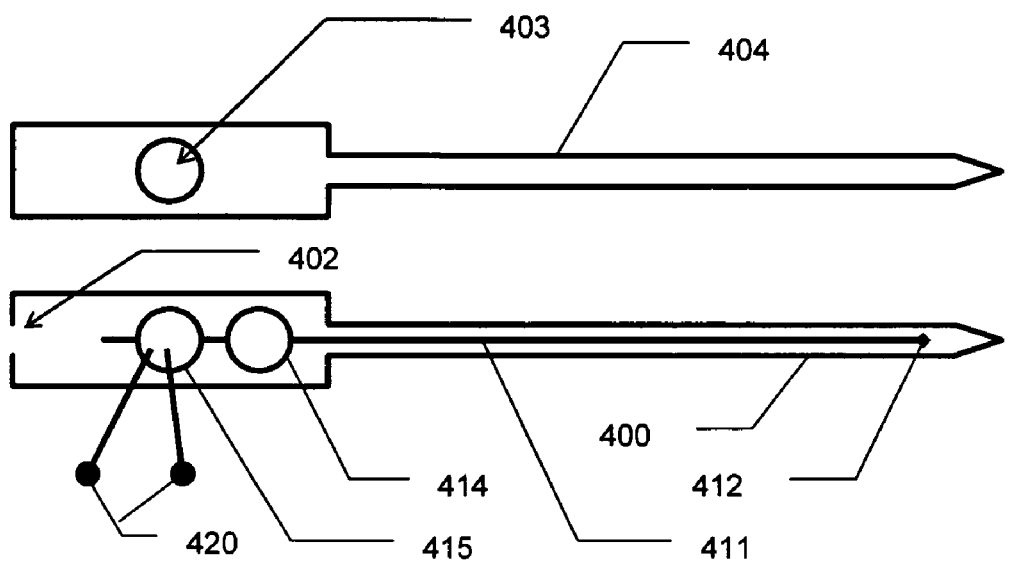

The sensor can now be inserted into the body of foodstuff, for example chicken, sausage or turkey, to be frozen. As an example, limiting the body cross-sectional area to less than 27 mm² can accommodate insertion into foodstuffs, for example a 2 mm diameter needle shape can be suitable. The food package with the sensor inserted in it can be put in a freezer to be frozen below 0 degrees Celsius. Thus, the SMA wire becomes Austenitic and softens, losing its tension. The indicator window 403 still shows a green indicator 414 as shown in FIG. 16b. Having been frozen the food package can now be inspected at an inspection station before shipping or placement in cold storage compartments and the inspector can break-off or remove the engagement knob 413 before the frozen food package is placed in a freezer for storing or shipping purposes. Upon breakage or removal of the engagement knob 413, as long as the temperature remains below the Austenitic temperature, the SMA wire will not contract and the green indicator 414 will show through the indicator window 403 as shown in FIG. 16c. If the food package ever experiences temperature above the Austenitic temperature, (for example, temperatures that would cause dangerous thawing of the foodstuff), the SMA element 411 will contract and the green 414 indicator will move to display the red indicator 415 through the indicator window 403 as shown in FIG. 16d. The indicator will not change to green, even if the sensor is refrozen, because the SMA wire does not lengthen to original length without an applied resilient force such as a linear spring.

Materials

Embodiments of the present invention can sense a wide range of temperatures when made with appropriate SMAs. Those skilled in the art know of many suitable SMAs, including Ag—Cd, Au—Cd, Cu—Al—Ni, Cu—Sn, In—Ti, Ni—Al, Ni—Ti, Fe—Mn—Si, Cu—Zn—A, Cu—Al—Ni, alloys thereof, and shape memory polymers such as polyurethanes. These materials typically possess Austenitic temperatures from −200° C. to 110° C. The addition of excess nickel, iron, chromium, and copper to the equiatomic alloy is common to adjust its physical properties (including its Austenitic finish temperature $A_f$). These materials exhibit a rather abrupt solid phase shape change, due to solid phase transformation between the Martensite and the Austenite state, when they experience temperatures above or below such transformation temperatures.

Control of Other Systems

Indicators according to the present invention can be combined with switches such as electrical or optical switches to control other sensors. As examples, the state of a temperature indicator can be used to open or close an electrical switch and disable or enable an electrical system when an over- or under-temperature condition has been experienced. As another example, the state of a temperature indicator can be used to interrupt an optical path, or interpose an optical element such as a reflector to complete an optical path, to control an optical switch, which switch can then control other systems. The activation or deactivation of such systems can be persistent since the present invention provides temperature indicators that provide persistent indication of temperature excursions. Such switch control can be achieved at positions 114 (where an optical switch 120 encounters nonreflective surface 114) and 115 (where an optical switch 120 encounters reflective surface 115) in FIG. 13; and positions 414 (where an electrical connection between terminals 420 is prevented by nonconducting surface 414) and 415 (where an electrical connection between terminals 420 is completed by conducting surface 415) in FIG. 16; and positions 5 and 6 in FIGS. 1-6; and positions 14 and 15 in FIGS. 7-9 (where motion of the element toggles the lever arm 27 of a conventional switch); and positions 25 and 26 in FIGS. 10-12; and the extreme positions of the sensor or the R and G indications of the various embodiments.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A switch responsive to temperature history, comprising:
   a) a body, defining a path from an attachment portion thereof to an engagement portion thereof;
   b) a sensing element, having a first portion mounted with the attachment portion such that motion of the first portion toward the engagement portion along the path is constrained, and having a second portion capable of first and second configurations, mounted with the engagement portion such that movement of the second portion toward the attachment portion along the path is prevented by such mounting when in the first configuration and not prevented when in the second configuration, and having a temperature responsive element made of a shape memory alloy mounted with the first and second portions such that changes in the temperature responsive element urge motion of the second portion toward the attachment portion along the path;
   c) a switch, mounted with the body such that motion of the second portion toward the attachment portion along the path causes a change in the state of the switch;
wherein the sensing element comprises a wire made of shape memory alloy, and wherein the body defines an opening sufficient to allow passage of the wire there through, and wherein the sensing element comprises a retainer too large to pass through the opening, which retainer is removeably mounted with the wire.

2. The switch of claim 1 wherein the switch comprises an electromechanical switch mounted with the body such that motion of the second portion toward the attachment portion along the path causes a change in the state of the electromechanical switch.

3. The switch of claim 1, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

4. The switch of claim 1, wherein the body has a length greater than 5 cm and less than 15 cm, and wherein the body comprises a first section having a cross-sectional area of less than 27 mm2 and a second section wherein temperature-responsive changes in the shape of the shape memory allow are observable.

5. A switch responsive to temperature history, comprising:
   a) a body, defining a path from an attachment portion thereof to an engagement portion thereof;
   b) a sensing element, having a first portion mounted with the attachment portion such that motion of the first portion toward the engagement portion along the path is constrained, and having a second portion capable of first and second configurations, mounted with the engagement portion such that movement of the second portion toward the attachment portion along the path is prevented by such mounting when in the first configuration and not prevented when in the second configuration, and having a temperature responsive element made of a shape memory alloy mounted with the first and second portions such that changes in the temperature responsive element urge motion of the second portion toward the attachment portion along the path;
   c) a switch, mounted with the body such that motion of the second portion toward the attachment portion along the path causes a change in the state of the switch; wherein
   d) the body defines a path having a length from an attachment portion thereof to an engagement portion thereof;
   e) the sensing element mounts at a first end with the attachment portion fixed along the direction of the path, and has a removable mounting with the engagement portion fixed along the direction of the path, wherein the sensing element comprises a shape memory alloy that, when in its Martensitic state, provides the sensing element with an initial length sufficient to allow both mountings, and, when in its Austenitic state, provides the sensing element with length less than the initial length unless constrained by the removable mounting;
   f) the switch is mounted with the body such that changes in length of the sensing element cause a change in the state of the switch and wherein
   g) the sensing element comprises a wire made of a shape memory alloy, having a first end and a second end, where the wire proximal the second end has a characteristic cross-section at a first distance from the second end, and an increased cross-section greater than the characteristic cross-section at a second distance, less than the first distance, from the second end;
   h) the body has tapering cross-section at a first body end, and has an opening prohibiting passage of wire of the increased cross-section and allowing passage of wire of the characteristic cross-section at a second body end;
   i) wherein the wire mounts fixedly with the body at the first body end, and passes through the opening at the second body end.

6. The switch of claim 5, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

7. The switch of claim 5, wherein the switch comprises an electromechanical switch mounted with the body such that motion of the second portion toward the attachment portion along the path causes a change in the state of the electromechanical switch.

8. The switch of claim 5, wherein the body has a length greater than 5 cm and less than 15 cm, and wherein the body comprises a first section having a cross-sectional area of less than 27 mm2 and a second section wherein temperature-responsive changes in the shape of the shape memory allow are observable.

9. A switch responsive to temperature history, comprising:
   a) a body, defining a path from an attachment portion thereof to an engagement portion thereof;
   b) a sensing element, having a first portion mounted with the attachment portion such that motion of the first portion toward the engagement portion along the path is constrained, and having a second portion capable of first and second configurations, mounted with the engagement portion such that movement of the second portion toward the attachment portion along the path is prevented by such mounting when in the first configuration and not prevented when in the second configuration, and having a temperature responsive element made of a shape memory alloy mounted with the first and second portions such that changes in the temperature responsive element urge motion of the second portion toward the attachment portion along the path;
   c) a switch, mounted with the body such that motion of the second portion toward the attachment portion along the path causes a change in the state of the switch;

d) a forcing element, having first and second portions, where the first forcing portion of the forcing element mounts with the second sensing element portion, and where the second forcing portion of the forcing element mounts with the engagement portion of the body;

e) a restraining element mounted with the body such that, when the second portion of the sensing element is in a first position the restraining element substantially prevents motion of the second portion toward the attachment portion;

f) wherein the forcing element is adapted to apply a force to the second sensing element portion having a component of force substantially along the path, wherein the component along the path is sufficient to stretch the temperature responsive element such that the second portion of the sensing element attains the first position when the temperature responsive element is in its softened state but insufficient to stretch the temperature responsive element such that the second portion of the sensing element attains the first position when the temperature responsive element is in its hardened state.

10. The switch of claim 9, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, C Cu—Al—Ni, alloys thereof, shape memory polymers, polyester prepolymers, and polyurethane.

11. A switch responsive to temperature history as in claim 9, wherein:

a) the sensing element is mounted at a first end with the attachment portion fixed along the direction of the path, and extending along the direction of the path toward the restraining portion, wherein the sensing element comprises a shape memory alloy that, when in its softened state, provides the sensing element with a first length sufficient to extend from the attachment portion to the restraining portion, and, when in its contracted state, provides the sensing element with second length less than the initial length unless constrained by the restraining portion;

b) wherein the restraining portion is adapted to, when the sensing element transitions from a length less than the first length to a length equal to the first length, prevent the subsequent shortening of the sensing element without external mechanical intervention after the sensing element attains the first length.

12. The switch of claim 11, further comprising a restrainable element mounted with the sensing element, and wherein the body defines a restraining portion adapted to allow motion of the restrainable element therethrough in one direction but not in the other direction once the second end has moved the sufficient distance away from the first end.

13. The switch of claim 12, wherein the shape memory alloy element is disposed within the body along a substantially linear path.

* * * * *